(12) United States Patent
Shindo et al.

(10) Patent No.: US 7,695,527 B2
(45) Date of Patent: Apr. 13, 2010

(54) HIGH PURITY COPPER SULFATE AND METHOD FOR PRODUCTION THEREOF

(75) Inventors: Yuichiro Shindo, Ibaraki (JP); Kouichi Takemoto, Ibaraki (JP)

(73) Assignee: Nippon Mining & Metals Co., Ltd, Tokyo (JP)

( * ) Notice: Subject to any disclaimer, the term of this patent is extended or adjusted under 35 U.S.C. 154(b) by 1001 days.

(21) Appl. No.: 10/566,750

(22) PCT Filed: Jul. 28, 2004

(86) PCT No.: PCT/JP2004/010714

§ 371 (c)(1),
(2), (4) Date: Feb. 1, 2006

(87) PCT Pub. No.: WO2005/023715

PCT Pub. Date: Mar. 17, 2005

(65) Prior Publication Data

US 2007/0053828 A1    Mar. 8, 2007

(30) Foreign Application Priority Data

Sep. 4, 2003    (JP) .............................. 2003-312118

(51) Int. Cl.
    *C01F 7/34*    (2006.01)
    *C22B 13/00*    (2006.01)
(52) U.S. Cl. ........................ 23/305 R; 23/297; 423/557
(58) Field of Classification Search .................. 423/557
See application file for complete search history.

(56) References Cited

U.S. PATENT DOCUMENTS

| 2,871,116 | A | * | 1/1959 | Clark | .......................... 423/141 |
| 4,030,990 | A | * | 6/1977 | Piret et al. | .................. 205/583 |
| 4,288,304 | A | * | 9/1981 | DeMarthe et al. | ............. 75/722 |
| 4,908,242 | A | * | 3/1990 | Hughes et al. | ........... 427/443.1 |
| 5,059,403 | A | * | 10/1991 | Chen | ............................ 423/24 |

(Continued)

FOREIGN PATENT DOCUMENTS

JP      47-040634 A     10/1972

(Continued)

OTHER PUBLICATIONS

ESP@CENET Database, One page English Abstract of JP 2001-010817, Jan. 16, 2001.

(Continued)

*Primary Examiner*—Melvin C Mayes
*Assistant Examiner*—Melissa Stalder
(74) *Attorney, Agent, or Firm*—Howson & Howson LLP

(57) ABSTRACT

Provided are high purity copper sulfate wherein the content of Ag impurities is 1 wtppm or less, and having a purity of 99.99 wt % or higher, and a manufacturing method of high purity copper sulfate including the steps of dissolving crude copper sulfate crystals or copper metal, and subjecting this to active carbon treatment or solvent extraction and active carbon treatment in order to realize recrystallization. The present invention aims to provide a manufacturing method of high purity copper sulfate capable of efficiently removing impurities at a low cost by dissolving commercially available copper sulfate crystals in purified water or acid and thereafter subjecting this to the refining process, and high purity copper sulfate obtained thereby.

15 Claims, 1 Drawing Sheet

U.S. PATENT DOCUMENTS 5,240,497 A * 8/1993 Shacham et al. ........... 106/1.26
2005/0232849 A1 10/2005 Shindo et al.

FOREIGN PATENT DOCUMENTS

| | | | |
|---|---|---|---|
| JP | 57-155399 | A | 9/1982 |
| JP | 61-083625 | A | 4/1986 |
| JP | 62030615 | A * | 2/1987 |
| JP | 63210291 | A * | 8/1988 |
| JP | 05-262523 | A | 10/1993 |
| JP | 07-053213 | A | 2/1995 |
| JP | 09-202619 | A | 8/1997 |
| JP | 2001-031419 | A | 2/2001 |
| SU | 1726381 | A1 * | 4/1992 |

OTHER PUBLICATIONS

ESP@CENET Database, One page English Abstract of JP 2001-031419, Feb. 6, 2001.

* cited by examiner

HIGH PURITY COPPER SULFATE AND METHOD FOR PRODUCTION THEREOF

BACKGROUND OF THE INVENTION

The present invention relates to a manufacturing method of high purity copper sulfate including the steps of dissolving commercially available copper sulfate crystals (purity, for instance, is 95 to 99.9 wt %) in purified water or acid, and thereafter removing impurities, and to the high purity copper sulfate obtained thereby. The starting raw material does not have to be copper sulfate crystals, and may be a resultant solution of dissolving copper in acid containing sulfuric acid, or copper sulfate crystals manufactured therefrom.

Copper sulfate ($Cu_2SO_4$) is a white-colored powder, but this generally refers to as a pentahydrate ($CuSO_4$-$5H_2O$), and is an azurite blue crystal.

Copper sulfate is being used as an electrolytic solution, pigment, insecticide, antiseptic, mordant, battery material, medicine and so on. In particular, when copper sulfate is to be used as the electroplating solution for electronic components such as a semiconductor device, high purity copper sulfate is sought after. Commercially available copper sulfate has a purity level of 95 to 99.9 wt %, and it is necessary to purify this further in order to realize a purity level of 4N to 5N or higher.

As conventional technology, disclosed is a method of obtaining copper sulfate with low Ni content by using electrolytic copper powder, which was electrodeposited and collected from an electrolytic solution, as the raw material, dipping this in acid to selectively dissolve and remove Ni, filtering the resultant solution and thereafter dissolving the copper powder in sulfuric acid to realize crystallization (e.g., refer to Japanese Patent Laid-Open Publication No. 2001-10817).

Further, also disclosed is technology for obtaining copper sulfate with a low nickel content by making copper sulfate containing nickel into an aqueous solution, heating this to 80° C. or higher, and collecting the copper sulfate crystals that are separated and settled as a result of the heating in order to realize concentrated recrystallization (e.g., refer to Japanese Patent Laid-Open Publication No. 2001-31419).

SUMMARY OF THE INVENTION

An object of the present invention is to provide a manufacturing method of high purity copper sulfate capable of efficiently removing impurities at a low cost by dissolving commercially available copper sulfate crystals in purified water or acid and thereafter subjecting this to the refining process, and high purity copper sulfate obtained thereby.

The present invention provides:
1) High purity copper sulfate wherein the content of Ag impurities is 1 wtppm or less, and having a purity of 99.99 wt % or higher;
2) High purity copper sulfate wherein the metalloid element impurities of As, Sb and Bi are respectively 1 wtppm or less, and having a purity of 99.99 wt % or higher;
3) High purity copper sulfate according to paragraph 1) above, wherein the metalloid element impurities of As, Sb and Bi are respectively 1 wtppm or less, and having a purity of 99.99 wt % or higher;
4) High purity copper sulfate wherein undissolved residue of 1 μm or greater exists in an amount of 100 residues/L or less, and having a purity of 99.99 wt % or higher;
5) High purity copper sulfate according to any one of paragraphs 1) to 3) above, wherein undissolved residue of 1 μm or greater in water exists in an amount of 100 residues/L or less, and having a purity of 99.99 wt % or higher;
6) High purity copper sulfate according to any one of paragraphs 1) to 5) above, having a purity of 99.999 wt % or higher;
7) A manufacturing method of high purity copper sulfate including the steps of dissolving crude copper sulfate crystals or copper metal, and subjecting this to solvent extraction and thereafter to active carbon treatment in order to realize recrystallization; and
8) A manufacturing method of high purity copper sulfate according to any one of paragraphs 1) to 6) above, including the steps of dissolving crude copper sulfate crystals or copper metal, and subjecting this to solvent extraction and thereafter to active carbon treatment in order to realize recrystallization.

The present invention yields a superior effect in that it is capable of efficiently removing impurities by dissolving commercially available copper sulfate having a purity level of 95 to 99.9 wt % in purified water or acid and thereafter subjecting this to solvent extraction and active carbon treatment, and thereby manufacturing high purity copper sulfate at a low cost.

DETAILED DESCRIPTION OF THE INVENTION

Figure 1:
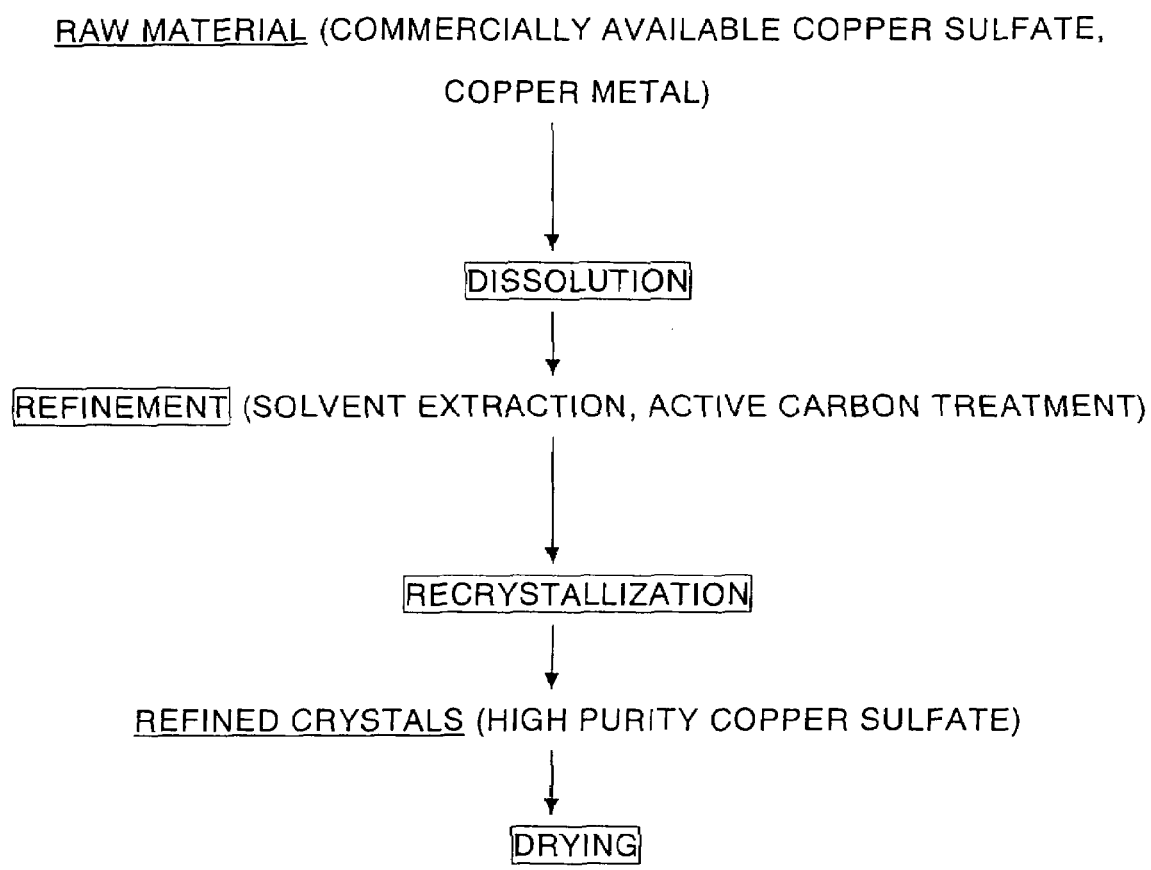
FIG. 1 is a diagram showing the flow of the manufacturing method of high purity copper sulfate.

Examples of analytical values of commercially available copper sulfate are shown in Table 1. As shown in Table 1, copper sulfate contains transition metals such as iron, nickel and cobalt, and impurities such as Ca, Cr, Al and Si in amounts of roughly 0.5 to 100 wtppm, respectively. Further, roughly several ppm of Ag, As, Sb and Bi are also contained therein.

In addition to the above, foreign matters such as impurities or oxides; for instance, several to several ten wtppm of alkali elements such as Na and K; and several ten wtppb of radio active elements such as U and Th are also contained therein.

Although it is also possible to dissolve commercially available copper metal or copper scrap in sulfuric acid and to use this as copper sulfate, in such a case, the foregoing impurities will still be contained therein.

As described above, particularly when using copper sulfate as the electroplating solution for electronic components such as a semiconductor device, it is necessary to use copper sulfate having a high purity of 99.99 wt % or higher. In particular, since Ag will become electrodeposited on the plating film and cause problems such as contamination, it must be reduced.

Ag is very similar to Cu, and is an element that is difficult to remove. Further, since it does not have any adverse effect on the electrical conduction property, conventionally, this was never intentionally removed. Nevertheless, a defect has been discovered in that the slight content of Ag in the electroplated film would cause the plated film to become hard and brittle.

With the plating wiring having this kind of defect, problems would arise in that such wiring would break or disconnect under stress. Therefore, in order to avoid this kind of defect, it is necessary to reduce Ag as much as possible; that is, to reduce Ag to 1 wtppm or less.

Further, metalloid element impurities of As, Sb and Bi are easily engulfed in the plated film, and must be reduced since they similarly cause the contamination of the plated film.

When As, Sb and Bi are engulfed in the thin film wiring, there is a problem in that the electrical conduction property will become inferior, and the resistivity will become high. Therefore, it is desirable to make these impurities to be within the foregoing scope.

In addition to the above, impurities such as organic matter and foreign matter are also contained, and these will become undissolved residue in water, and similarly cause the contamination of the plated film. Thus, these impurities must be reduced to 100 residues/L or less. Specifically, this undissolved residue caused problems the thinner the wiring width of the semiconductor became. This was overlooked in the past.

In particular, upon embedding in a trench, there was a problem in that the embedding could not be conducted or would be insufficient as a result of being obstructed by foreign matter. In order to reduce the generation of defective goods, the existence of undissolved residue is a problem that can no longer be overlooked, and it is therefore desirable to make such undissolved residue to be within the foregoing scope.

Generally speaking, it is desirable that the conditions for reducing Ag, reducing As, Sb, Bi and undissolved residue are all fulfilled, but there are cases that the conditions would not cause a particular problem depending on the purpose or characteristic of the wiring. In other words, such conditions may be suitably selected depending on which characteristic is important. Therefore, the conditions may be adjusted independently. The present invention covers all such cases.

The foregoing copper sulfate is dissolved in purified water or acid such as diluted sulfuric acid at room temperature, and this is thereafter subject to solvent extraction. Further, active carbon treatment is performed to remove impurities such as organic matter and foreign matter as well as noble metals such as Ag. The removal of impurities such as organic matter and foreign matter and oil films, and the removal of noble metals such as Ag via active carbon treatment do not exist in conventional technology, and such removal process is a new discovery and method provided by the present invention.

Thereafter, impurities such as organic matter and foreign matter are filtered and removed. When there is undissolved foreign matter and the like, these are also filtered and removed.

Next, the solution or filtrate that dissolved copper sulfate is heated to a temperature of roughly 50 to 100° C., and subject to evaporative concentration. After performing evaporative concentration, this is cooled to room temperature, and crystals are deposited thereby.

TABLE 1

| Impurity Element | Raw Material | Reference Example 1 | Example | Example 2 | wtppm Comparative Example 1 |
|---|---|---|---|---|---|
| B | 1 | <0.01 | <0.01 | <0.01 | 0.7 |
| Na | 13 | <0.1 | 0.7 | <0.1 | 7 |
| Mg | 0.8 | <0.01 | <0.01 | <0.01 | 0.5 |
| Al | 3.2 | <0.1 | <0.1 | <0.1 | 1.6 |
| Si | 17 | 0.5 | 0.7 | 0.2 | 8 |
| P | 2.3 | 0.3 | <0.1 | 0.1 | 1.1 |
| Cl | 8.5 | 0.5 | 0.7 | <0.1 | 3.5 |
| K | 3.1 | <0.1 | 0.3 | <0.1 | 1.2 |
| Ca | 3.5 | <0.1 | 0.8 | <0.1 | 1.0 |
| Ti | 0.4 | <0.01 | <0.01 | <0.01 | 0.3 |
| Cr | 18.1 | <0.1 | 0.9 | <0.1 | 9.5 |
| Mn | 0.2 | <0.1 | <0.1 | <0.1 | 0.1 |
| Fe | 81 | <0.1 | 7.6 | <0.1 | 8.5 |
| Co | 3.5 | <0.1 | 0.35 | <0.1 | 1.5 |
| Ni | 4.3 | <0.1 | 0.43 | <0.1 | 1.2 |

TABLE 1-continued

| Impurity Element | Raw Material | Reference Example 1 | Example | Example 2 | wtppm Comparative Example 1 |
|---|---|---|---|---|---|
| Ag | 2.5 | <0.01 | 0.1 | <0.01 | 1.5 |
| As | 4.8 | <0.1 | 0.32 | <0.1 | 3.2 |
| Sb | 2.4 | <0.1 | 0.15 | <0.1 | 1.3 |
| Bi | 2.1 | <0.1 | 0.18 | <0.1 | 1.8 |
| Th | 0.02 | <0.001 | 0.001 | <0.001 | 0.01 |
| U | 0.01 | <0.001 | 0.001 | <0.001 | 0.007 |
| Undissolved Residue in Water (Residue/L) | 150 | None | None | None | 110 |

Thereafter, this is cooled to room temperature, crystals of copper sulfate are deposited, and these are filtered to obtain blue-colored high purity copper sulfate. The initial crystals may be removed as necessary.

It is desirable that the filtrate after the ultimate filtration is 2 to 40 wt % of the original fluid volume. This is in order to prevent impurities such as Na and K from getting mixed into the crystals by remaining non-crystallized copper sulfate in a residual liquid.

The drying temperature is preferably 40 to 100° C. If the temperature is less than 40° C., too much time will be required for removing the adsorption moisture, and if the temperature exceeds 100° C., this is not preferable since the adhesive moisture of pentahydrates will be removed and the form of copper sulfate will change. The impurities after the foregoing refining process are similarly shown in Table 1.

The various impurities shown in Table 1 are reduced respectively to 1 ppm or 0.1 ppm or less, and high purity copper sulfate having a purity level of 4N to 5N is obtained. Incidentally, among the elements shown in Table 1, although there are certain elements (for instance Na, Si, Cl, Ca, Cr, Fe, Co and Ni) that are contained in amounts slightly more than Ag or As, Sb and Bi, these impurities will remain in the bath as ions when using these impurities as a copper sulfate solution, and it is unlikely that these will enter the film wiring. Thus, no problems will arise with the level of these impurities shown in Table 1. The flow of the manufacturing method of high purity copper sulfate according to the present invention is shown in FIG. 1.

EXAMPLES

The Examples are now explained. Incidentally, these Examples are merely illustrative, and the present invention shall in no way be limited thereby. In other words, the present invention shall only be limited by the scope of claim for a patent, and shall include the various modifications other than the Examples of this invention.

Example 1

250 g of commercially available copper sulfate crystals ($Cu_2SO_4$-$5H_2O$) having a purity level of 99.9 wt % and containing the impurities shown in Table 1 were dissolved in 1000 ml of diluted sulfuric acid at room temperature.

Next, this was subject to solvent extraction with D2EHPA. This was further subject to active carbon treatment in order to remove impurities such as organic matter and Ag as well as foreign matter. This was thereafter heated to 900° C. or higher, and water was evaporated in a prescribed amount. Crystals started to appear from around 700 ml, and ended at 200 ml.

Next, this was cooled to room temperature in order to deposit refined copper sulfate crystals, and the crystals were filtered. Since there is a risk that impurities such as Na and K could get mixed into the refined copper sulfate when evaporation is increased extremely, evaporation was stopped midway in order to obtain a residual liquid.

When this high purity copper sulfate was redissolved and was filtered, there was no undissolved residue of 1 μm or greater in water. The results are shown in Table 1.

As shown in Table 1, the various impurities listed in Table 1 have been reduced respectively to 1 wtppm or 0.1 wtppm or less, and high purity copper sulfate having a purity level of 4N to 5N or higher was obtained. With the processes shown in Example 1 of the present invention, a significant improvement in purity has been confirmed.

These impurities are particularly disfavored in the copper plating to circuits or wirings upon manufacturing a semiconductor device or the like, and the reduction of such impurities is extremely effective.

Reference Example

The same raw material as with Example 1 was used, and, without subjecting this to solvent extraction, only the active carbon treatment and the subsequent processes of Example 1 were performed. The results are shown in Table 1.

As shown in Table 1, although slightly inferior to Example 1, only Fe was 7.6 wtppm, and the other impurities have been reduced to 1 wtppm or 0.1 wtppm or less, and high purity copper sulfate having a purity level of 4N to 5N was obtained. Further, when this high purity copper sulfate was redissolved, there was no undissolved residue in water when filterd at 1 μm or more.

With the processes shown in the Reference Example, although an improvement in purity is less than Example 1, a reasonable improvement in purity has been confirmed. These impurities are particularly disfavored in the copper plating to circuits or wirings upon manufacturing a semiconductor device or the like, and the reduction of such impurities is extremely effective.

Example 2

Copper scrap raw material having the same purity level as with Example 1 was used, and the same processes as with Example 1 were performed. The results are shown in Table 1.

As shown in Table 1, impurities have been reduced to 1 wtppm or 0.1 wtppm or less, and high purity copper sulfate having a purity level of 4N to 5N was obtained. Further, when this high purity copper sulfate was redissolved, there was no undissolved residue in water when filtered at 1 μor more.

With the processes shown in Example 2 of the present invention, a significant improvement in purity has been confirmed. These impurities are particularly disfavored in the copper plating to circuits or wirings upon manufacturing a semiconductor device or the like, and the reduction of such impurities is extremely effective.

Comparative Example 1

The same raw material as with Example 1 was used, and, without subjecting this to solvent extraction and active carbon treatment, the same processes as with Example 1 were performed for recrystallization. The results are shown in Table 1.

As shown in Table 1, reduction of impurities was hardly achieved. Further, when this high purity copper sulfate was redissolved and was filtered, undissolved residue of 1 μm or greater in water existed in an amount of 110 residues/L.

The improvement in purity could not be achieved with the Comparative Example, and these impurities caused problems in that impurities which are particularly disfavored in the copper plating to circuits or wirings upon manufacturing a semiconductor device or the like remained in large quantities.

The present invention yields a superior effect in that it is capable of efficiently removing impurities by dissolving commercially available copper sulfate having a purity level 95 to 99.9 wt % in purified water or acid and thereafter subjecting this to solvent extraction or active carbon treatment, and thereby manufacturing high purity copper sulfate at a low cost, and is extremely useful as an electrolytic solution, pigment, insecticide, antiseptic, mordant, battery material, medicine and so on, as well as the electroplating solution for electronic components such as a semiconductor device.

The invention claimed is:

1. A copper sulfate comprising a high purity copper sulfate having a purity of 99.99 wt % or higher and contents of Ag impurities of less than 0.01 wtppm, metalloid element impurities of As, Sb, and Bi of less than 0.1 wtppm, respectively, radioactive elements of U and Th of less than 0.001 wtppm, respectively, and heavy metal elements of Fe, Cr, and Ni of less than 0.1 wtppm, respectively.

2. A copper sulfate according to claim 1, wherein organic and foreign matter impurities are contained at a level such that, when said copper sulfate is dissolved in water, undissolved residue of 1 μm or greater exists in an amount of 100 residues/L or less.

3. A copper sulfate according claim 2, wherein said high purity copper sulfate has a purity of 99.999 wt % or higher.

4. A copper sulfate according claim 1, wherein said high purity copper sulfate has a purity of 99.999 wt % or higher.

5. A method of manufacturing high purity copper sulfate comprising the steps of dissolving copper sulfate having a purity of 95 to 99.5 wt %, and subjecting this to active carbon treatment and solvent extraction to realize recrystallization and to produce a high purity copper sulfate having a purity of 99.99 wt % or higher and contents of Ag impurities of less than 0.01 wtppm, metalloid element impurities of As, Sb, and Bi of less than 0.1 wtppm, respectively, radioactive elements of U and Th of less than 0.001 wtppm, respectively, and heavy metal elements of Fe, Cr, and Ni of less than 0.1 wtppm, respectively.

6. A method according to claim 5, wherein organic and foreign matter impurities are reduced to a level such that, when said high purity copper sulfate is dissolved in water, undissolved residue of 1 μm or greater exists in an amount of 100 residues/L or less.

7. A method according claim 6, wherein said high purity copper sulfate has a purity of 99.999 wt % or higher.

8. A method according claim 5, wherein said high purity copper sulfate has a purity of 99.999 wt % or higher.

9. A method of manufacturing high purity copper sulfate, comprising the steps of:
dissolving copper sulfate crystals or copper metal raw material having a purity of 95 to 99.9 wt % in purified water or acid at room temperature to form a solution;
subjecting said solution to solvent extraction and active carbon treatment;
after said solvent extraction and active carbon treatment, filtering said solution, heating the filtrate to a temperature of 50 to 100° C., and performing evaporative concentration thereto;
after said filtering, heating and evaporative concentration, cooling said filtrate to room temperature to deposit high purity copper sulfate crystals of blue color having a purity of 99.99 wt % or higher and contents of Ag impurities of less than 0.01 wtppm, metalloid element impurities of As, Sb, and Bi of less than 0.1 wtppm, respectively, radioactive elements of U and Th of less than 0.001 wtppm, respectively, and heavy metal elements of Fe, Cr, and Ni of less than 0.1 wtppm, respectively.

10. A method according to claim 9, wherein during said dissolving step, the purified water or acid is diluted sulfuric acid.

11. A method according to claim 10, wherein, during said dissolving step, the copper sulfate crystals or copper metal raw material is copper sulfate crystals ($Cu_2SO_4 \cdot 5H_2O$) having a purity of 95 to 99.9 wt %.

12. A method according to claim 9, wherein the solvent extraction is performed with D2EHPA.

13. A method according to claim 9, wherein, during said cooling step, the depositing of high purity copper sulfate crystals is terminated such that a residual liquid containing non-recrystallized copper sulfate remains.

14. A method according to claim 13, wherein the residual liquid is 2 to 40 wt % of an original fluid volume of the filtrate.

15. A method according to claim 13, further comprising the steps of removing the high purity copper sulfate crystals from the residual liquid and drying the high purity copper sulfate crystals at a drying temperature of 40 to 100° C.

* * * * *

UNITED STATES PATENT AND TRADEMARK OFFICE
CERTIFICATE OF CORRECTION

| | |
|---|---|
| PATENT NO. | : 7,695,527 B2 |
| APPLICATION NO. | : 10/566750 |
| DATED | : April 13, 2010 |
| INVENTOR(S) | : Yuichiro Shindo et al. |

Page 1 of 1

It is certified that error appears in the above-identified patent and that said Letters Patent is hereby corrected as shown below:

Column 3 of Table 1 on Column 3, lines 53 and 54:
--Reference Example 1-- should read --Example 1--.

Column 4 of Table 1 on Column 3, lines 53 and 54 of the patent:
--Example-- should read --Reference Example--.

Signed and Sealed this

Twenty-second Day of June, 2010

David J. Kappos
*Director of the United States Patent and Trademark Office*